United States Patent
Gerndorf et al.

(10) Patent No.: US 10,246,032 B2
(45) Date of Patent: Apr. 2, 2019

(54) TRIM FOR A MOTOR VEHICLE

(71) Applicant: Dura Automotive Holdings U.K., Ltd., Birmingham (GB)

(72) Inventors: Ralf Gerndorf, Finnentrop (DE); Jochen Schulze Zur Wiesche, Köln (DE); Norfried Bittner, Witten (DE); Axel Nüsken, Altena (DE); Martin Schulte, Balve (DE)

(73) Assignee: DURA AUTOMOTIVE HOLDINGS, U.K., LTD., Birmingham (GB)

( * ) Notice: Subject to any disclaimer, the term of this patent is extended or adjusted under 35 U.S.C. 154(b) by 0 days.

(21) Appl. No.: 15/363,465

(22) Filed: Nov. 29, 2016

(65) Prior Publication Data

US 2017/0072871 A1    Mar. 16, 2017

Related U.S. Application Data

(63) Continuation of application No. 14/636,333, filed on Mar. 3, 2015, now Pat. No. 9,533,628, which is a (Continued)

(51) Int. Cl.
| | |
|---|---|
| *B60R 13/04* | (2006.01) |
| *B60R 25/24* | (2013.01) |
| *B60R 11/02* | (2006.01) |
| *B60R 13/02* | (2006.01) |
| *B60R 25/01* | (2013.01) |
| *B60R 25/23* | (2013.01) |
| *B60R 25/25* | (2013.01) |
| *B62D 25/04* | (2006.01) |
| *B60R 11/00* | (2006.01) |

(52) U.S. Cl.
CPC .......... *B60R 13/04* (2013.01); *B60R 11/0235* (2013.01); *B60R 13/02* (2013.01); *B60R 13/025* (2013.01); *B60R 13/0243* (2013.01); *B60R 25/01* (2013.01); *B60R 25/23* (2013.01); *B60R 25/24* (2013.01); *B60R 25/252* (2013.01); *B62D 25/04* (2013.01); *B60R 2011/0047* (2013.01); *B60R 2011/0071* (2013.01); *B60R 2013/0287* (2013.01)

(58) Field of Classification Search
CPC . B60R 11/00; B60R 11/0229; B60R 11/0235; B60R 13/02; B60R 13/04; B60R 13/0243; B60R 13/025; B60R 25/23; B60R 25/24; E05B 17/10; F21S 48/00
USPC .................................................. 296/1.08, 21
See application file for complete search history.

(56) References Cited

U.S. PATENT DOCUMENTS 7,350,949 B2 * 4/2008 Meinke ................ B60Q 1/2669
362/540
8,405,527 B2    3/2013 Chung et al.
(Continued)

FOREIGN PATENT DOCUMENTS

JP    4218660 B2    2/2009

*Primary Examiner* — Jason S Daniels
(74) *Attorney, Agent, or Firm* — Robert E. Ford; Raymond J. Vivacqua; Steven L. Crane

(57) ABSTRACT

A trim made of plastics for a vehicle, in particular a motor vehicle, comprises a first component (7) made of plastics and a second component (8) made of plastics. To improve such trim, the first component (7) is at least partly transparent or semi-transparent. The second component (8) includes one or more recesses (10, 11, 12) for a display element and/or for an input element (FIG. 2).

23 Claims, 10 Drawing Sheets

Related U.S. Application Data continuation of application No. 13/263,195, filed as application No. PCT/EP2010/002109 on Apr. 1, 2010, now Pat. No. 8,998,282.

(56) References Cited

U.S. PATENT DOCUMENTS

| | | |
|---|---|---|
| 2008/0157605 A1 | 7/2008 | Bowden et al. |
| 2009/0160529 A1* | 6/2009 | Lamborghini ......... B60K 37/06 327/517 |

* cited by examiner

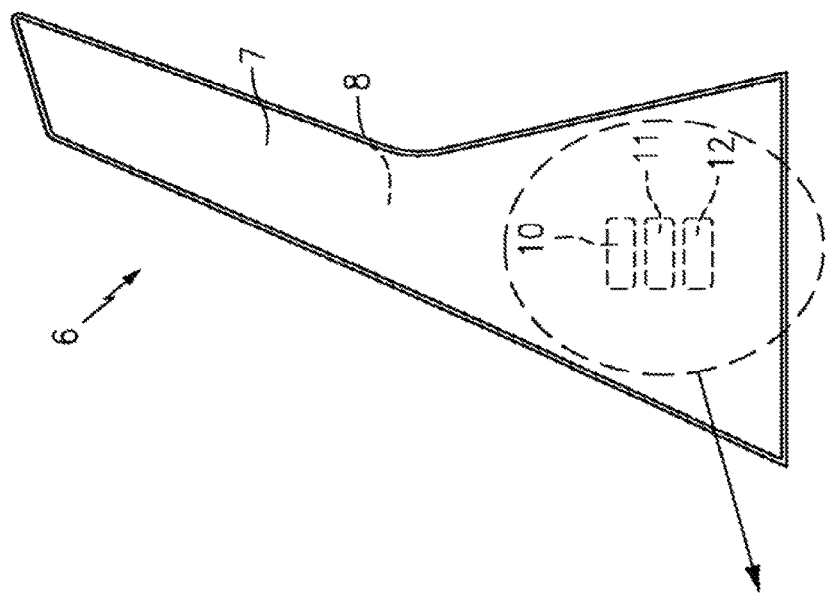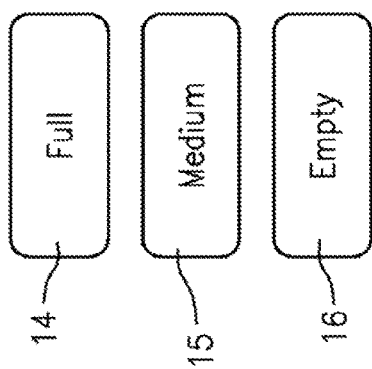
FIG. 4

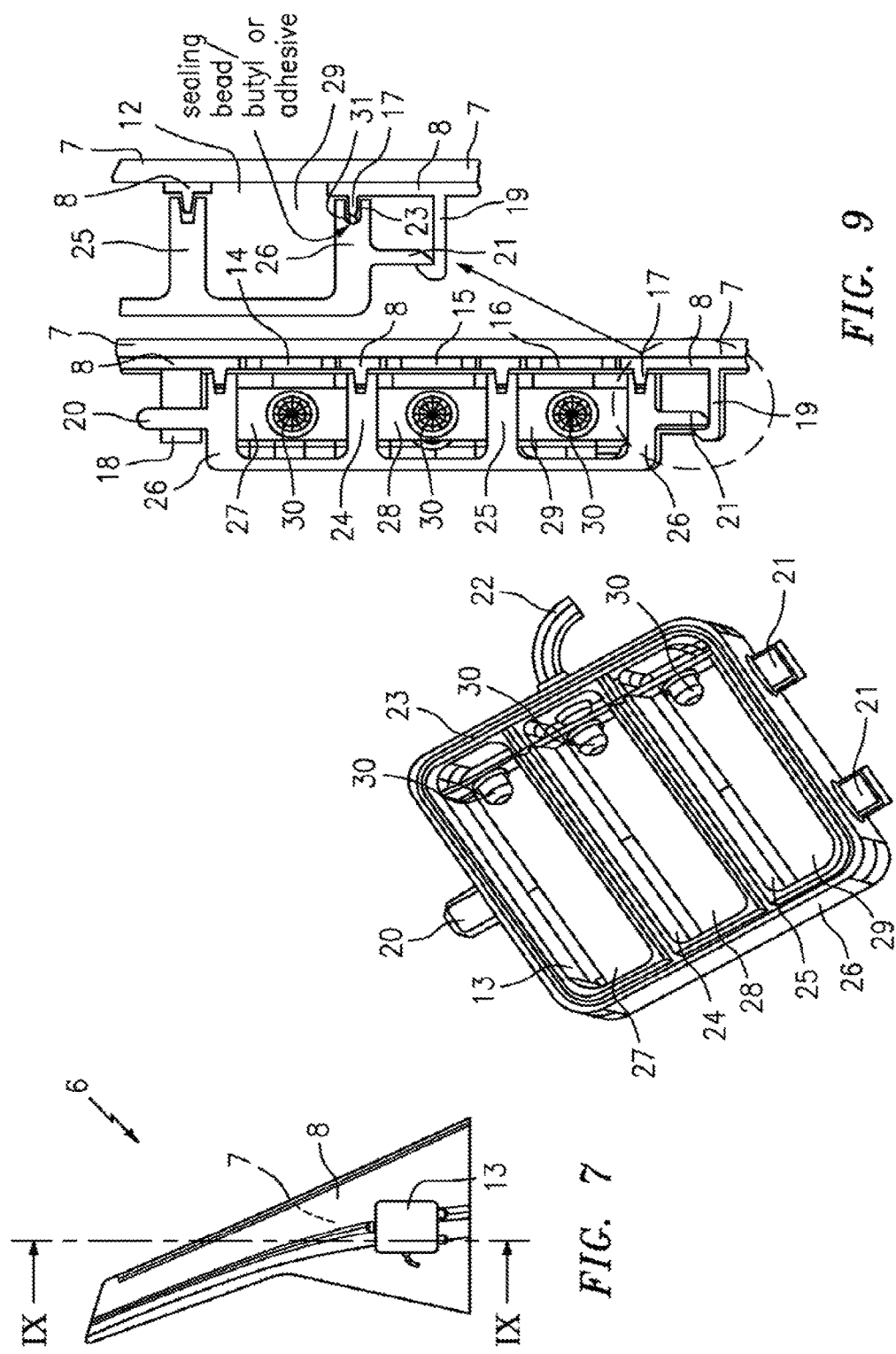

TRIM FOR A MOTOR VEHICLE

CROSS-REFERENCE TO RELATED APPLICATIONS

This application is a continuation of U.S. Non-Provisional application Ser. No. 14/636,333 filed on Mar. 3, 2015, which is a continuation of U.S. Non-Provisional application Ser. No. 13/263,195 filed on Oct. 6, 2011, now U.S. Pat. No. 8,998,282, filed as application No. PCT/EP2010/002109 on Apr. 1, 2010. The disclosure of the above applications are incorporated herein by reference.

BACKGROUND

This invention relates to a trim or some other decorative part made of plastics for a vehicle, in particular for a motor vehicle, with a first component made of plastics and with a second component made of plastics.

Such trim is known from EP 1 695 808 A1. The prior art trim comprises a first component made of plastics, namely a covering member made of a thermoplastic material and a second component made of plastics, namely a carrier member made of a thermoplastic material. The first component is provided on a visible surface of the trim. It performs a decorative function. The second component performs mechanical functions, in particular a fastening function. The trim is manufactured by a multi-component injection molding method, in particular by a two-component injection molding method (2-component method).

SUMMARY

It is the object of the invention to propose an improved trim of the type mentioned above.

In accordance with the invention, this object is solved by the features herein. The first component is at least partly transparent or semi-transparent. The second component includes a recess or cutout for a display element and/or for an input element. In this way, it is possible to utilize the trim for displaying information. Instead or in addition, the trim can be utilized for inputting information. There can also be provided a plurality of display elements and/or input elements. The second component can include one or more recesses or cutouts.

It is possible that the first component is partly transparent or semi-transparent. In this case, the transparent or semi-transparent region of the first component extends over a partial region of this first component. The first component can, however, also be completely transparent or semi-transparent. In this case, the entire region of the first component is transparent or semi-transparent. In both cases, the transparent or semi-transparent region of the first component fully or partly extends over the recess (cutout) or the recesses (cutouts) in the second component.

The first component preferably lies on an outside of the trim. It can be covered by one or more further layers, in particular by a coating, wherein this further layer or further layers or the coating are completely or partly transparent or semi-transparent. Preferably, the first component forms a visible surface on the vehicle or motor vehicle, preferably on the outside, possibly however also on the inside, of the vehicle or motor vehicle.

It is possible that the trim includes further components and/or layers and/or parts. The trim preferably is manufactured by a multi-component injection molding method, in particular by a two-component injection molding method (2-component method) or by a three-component injection molding method (3-component method).

Advantageous developments are described herein.

The first component preferably is made of a thermoplastic material. PMMA or PC or related plastic materials are particularly useful. The first component in particular can be made of scratch-proof PMMA or some other scratch-proof plastic or thermoplastic material.

Advantageously, the first component has a glossy surface and/or elevations, in particular elevations in the form of a lettering or logo.

In accordance with a further advantageous development, the second component is made of a thermoplastic material. ABS, ABS/PC or ASA or related plastic materials are particularly useful.

A further advantageous development is characterized in that on the second component one or more fastening elements for fastening the one or more display elements and/or the one or more input elements are provided. The display element and/or the input element can directly or indirectly be attached to the one or more fastening elements. Advantageously, the one or more fastening elements are molded to the second component.

In accordance with a further advantageous development, a housing for the one or more display elements and/or the one or more input elements is attachable or attached to the second component. The housing preferably is sealable or sealed. Particularly advantageously, the housing is attachable or attached to one or more fastening elements on the second component.

The one or more display elements and/or the one or more input elements can be self-luminous.

Instead or in addition, the one or more display elements and/or the one or more input elements can be illuminated, preferably by an illuminating means. Useful illuminating means include in particular LEOs, color-controllable films (for example a three-layer RGB film) or an electroluminescent luminous element. Both in self-luminous display elements/input elements and in illuminated display elements/input elements, the luminous color and/or the luminous intensity can be variable.

The one or more display elements and/or the one or more input elements and/or the one or more illuminating means for the one or more display elements and/or the one or more input elements can be activatable and/or variable by sensors and/or switches.

By means of the display element, in particular the charge condition of a battery-powered vehicle and/or a graphic, a lettering and/or a logo and/or a flasher and/or a locking information and/or a reflector and/or a parking time information and/or a taxi information can be displayed.

Advantageously, the input element comprises a keypad and/or one or more sensors, in particular a fingerprint sensor and/or a sensor for a keyless-go system.

The invention furthermore relates to a vehicle, in particular a motor vehicle, which is characterized by one or more trims or other decorative parts in accordance with the invention.

BRIEF DESCRIPTION OF THE DRAWINGS

Embodiments of the invention will be explained in detail below with reference to the attached drawing. In the drawing FIG. 4 shows FIG. 2 with an enlarged cut-out representation, FIG. 7 shows a downsized representation of FIG. 3 including a sectional line IX-IX, FIG. 8 shows the housing illustrated in FIGS. 3, 5 and 7 in a view from below, FIG. 9 shows a section along line IX-IX in FIG. 7.

DETAILED DESCRIPTION

Figure 1:
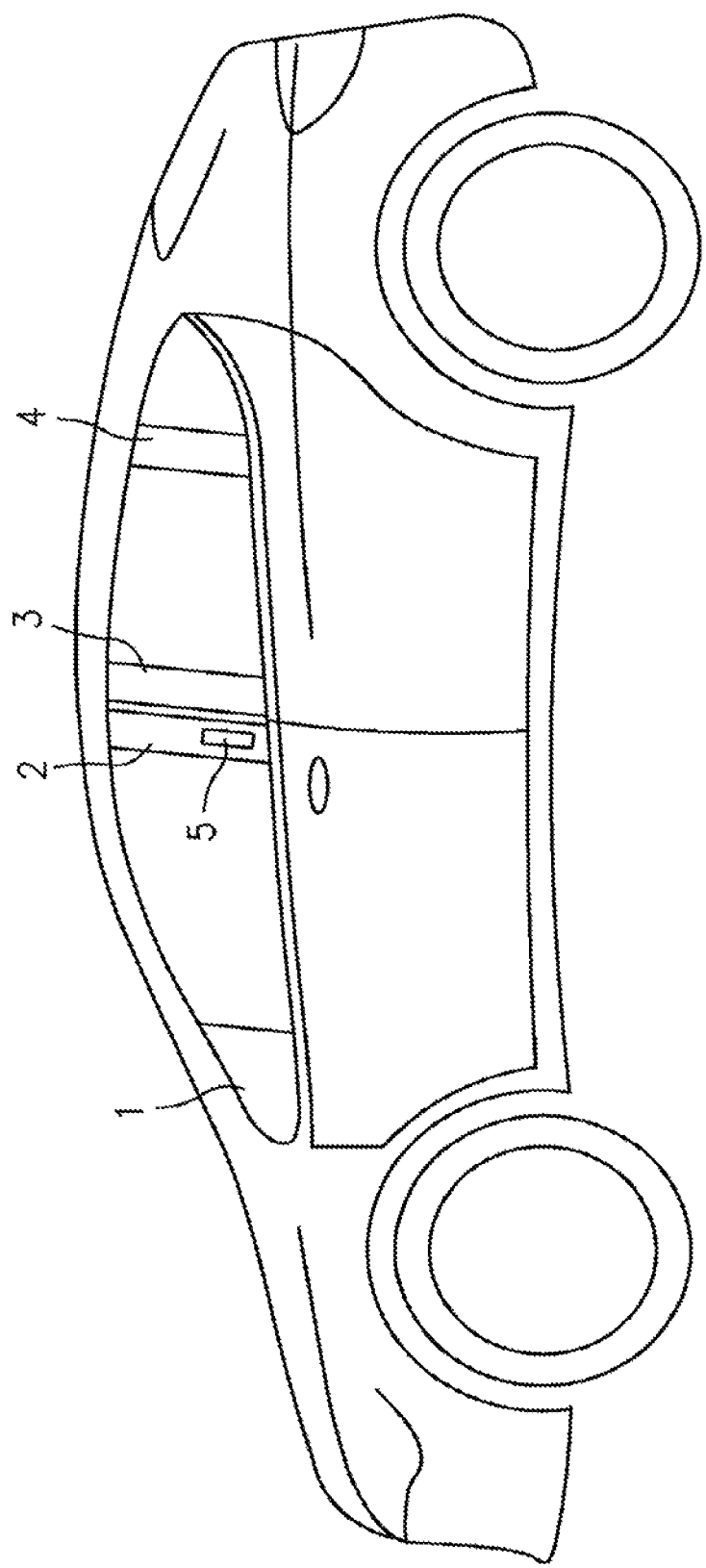
FIG. 1 shows a motor vehicle with trims in accordance with the invention in a side view.

The motor vehicle shown in FIG. 1 includes a plurality of trims, namely a mirror trim 1 in the region of the rearview mirror, a rear trim 2 of the front door, a front trim 3 of the rear door and a rear trim 4 of the rear door. In the trim 2 a display element 5 is provided for displaying information.

Figure 3:
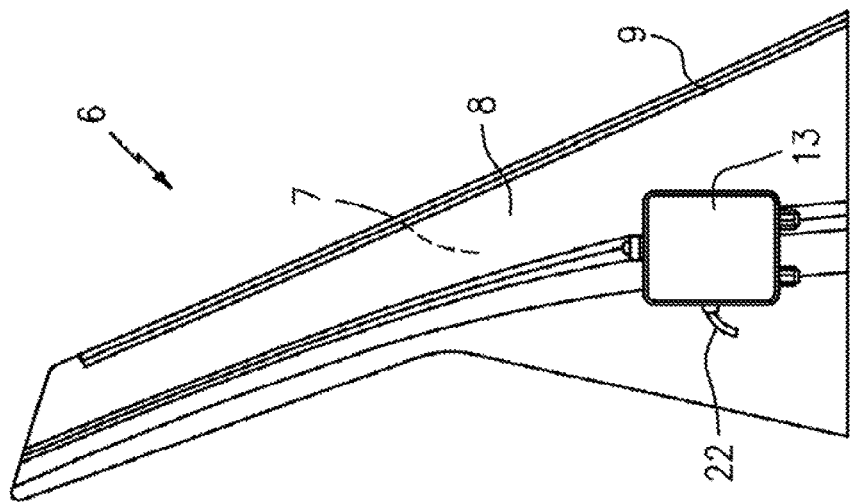
FIG. 3 shows the trim according to FIG. 2 in a view from inside.
Figure 2:
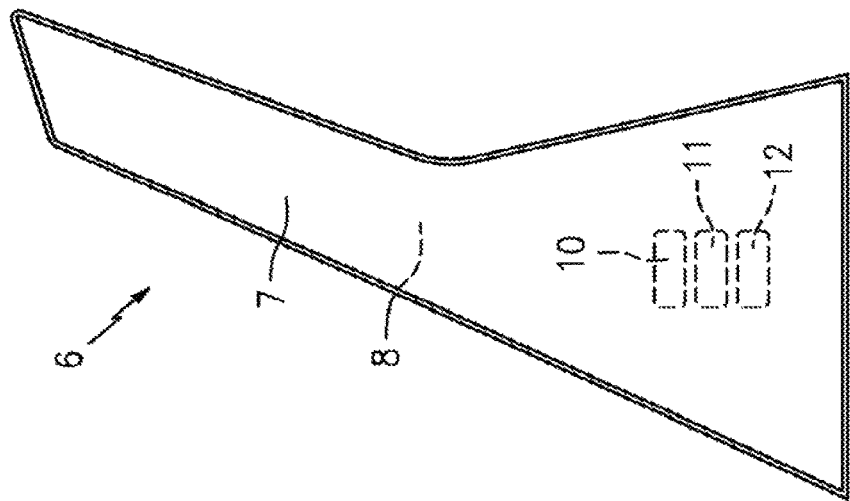
FIG. 2 shows a trim with a charge indicator for a battery-powered motor vehicle in a view from outside.

FIGS. 2 and 3 show a further trim 6 for a motor vehicle in a view from outside and inside. The trim 6 is made by a two-component injection molding method. The first component 7 consists of scratch-proof PMMA. It is completely semi-transparent, i.e. in its entire region. The first component 7 has a glossy, continuous, chiefly smooth surface without cut-outs.

The second component 8 is made of ABS. It has a black color. It lies behind the first component 7 forming the visible surface. On the second component 8, a strip 9 is provided on, namely molded to the motor vehicle for attachment of the trim 6.

The second component 8 includes three recesses or cutouts 10, 11, 12 (see FIG. 2), which each have a rectangular, rounded shape and are arranged one below the other flush and at a distance from each other. In FIG. 3, the recesses or cutouts 10, 11, 12 are covered by a housing 13 which is attached to the second component 8.

FIG. 4 shows the display elements 14, 15, 16, which are located in the recesses or cutouts 10, 11, 12, in an enlarged representation. The display elements 13, 14, 15 form a charge indicator for a battery-powered motor vehicle. The display element 14 is an illuminated display element in green color with the inscription "Full". It is located in the recess or cutout 10 and indicates the full charge condition of the battery. The display element 15 is an illuminated display element in yellow color with the inscription "Medium". It is located in the recess or cutout 11 and indicates a medium charge condition of the battery. The display element 16 is an illuminated display element in red color with the inscription "Empty". It is located in the recess or cutout 12 and indicates an insufficient charge condition of the battery. The first component 7 is semi-transparent such that in the illuminated condition the display elements 13, 14, 15 are visible through the first component 7.

Figure 5:
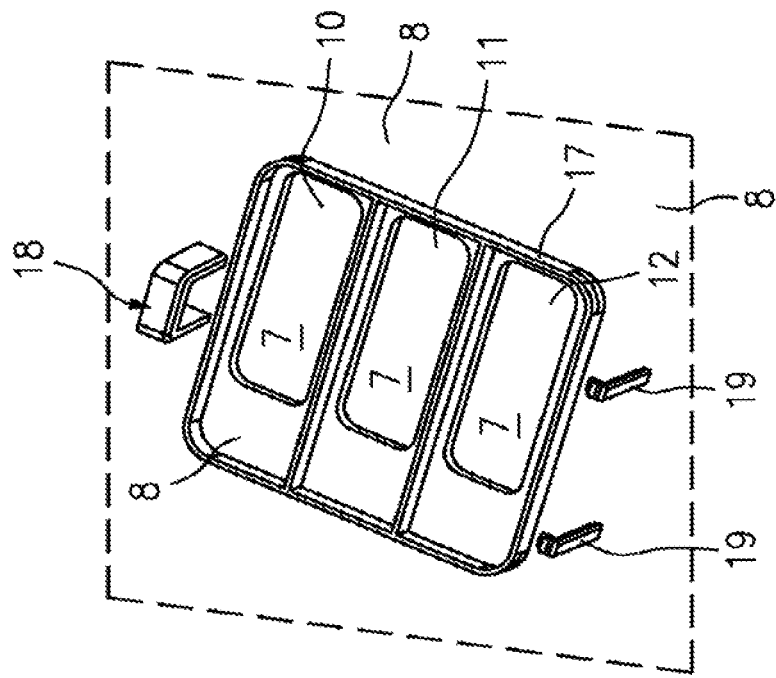
FIG. 5 shows an enlarged partial view of FIG. 3.
Figure 6:
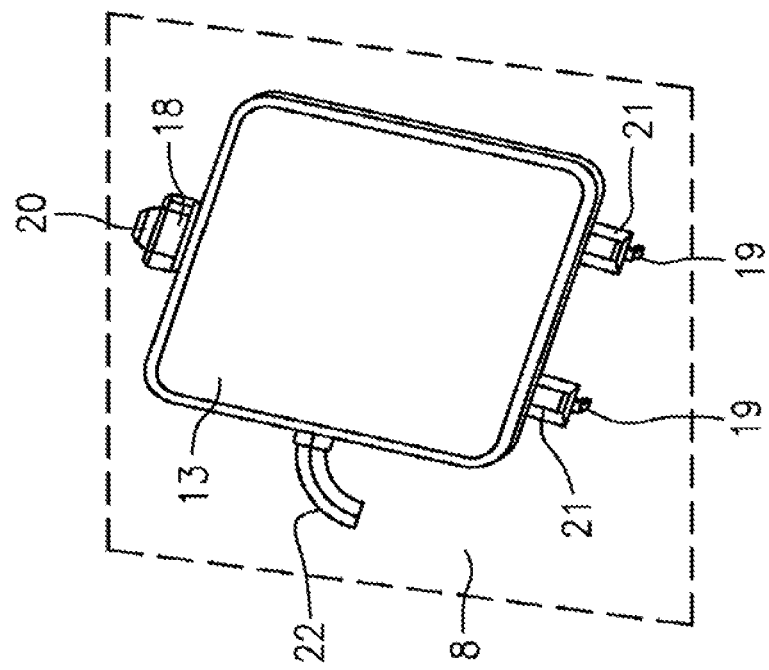
FIG. 6 shows the item of FIG. 5 with removed housing.

FIGS. 5 and 6 show the trim 6 in a representation from inside corresponding to FIG. 3. The second component 8 includes fastening elements for the housing 13. The fastening elements are formed by a circumferential frame 17, a first hook 18 and two second hooks 19. The fastening elements 17, 18, 19 are molded to the second component 8. They protrude from the plane of the second component 8.

The recesses or cutouts 10, 11, 12 in the second component 8 lie inside the circumferential frame 17. In the region of the recesses or cutouts 10, 11, 12, the first component 7 is visible from the rear in FIG. 6. The border of the recesses or cutouts 10, 11, 12 located inside the circumferential frame 17 is formed by the second component 8.

The recesses or cutouts 10, 11, 12 can be covered by the housing 13. In the housing 13, the display elements 14, 15, 16 are provided. The housing 13 engages over the circumferential edge 17. By its first hook 20 it is interlocked with the first hook 18 of the second component 8 and by its second hook 21 it is interlocked with the second hook 19 of the second component 8, as shown in FIG. 5. The power supply of the display elements 14, 15, 16 is effected by a power cable 22.

FIG. 8 shows the housing 13 from inside. In the mounted condition, its circumferential groove 23 engages over the circumferential edge 17 of the second component 8. In the housing 13, intermediate walls 24, 25 are provided, which separate three chambers 27, 28, 29 from each other by means of the circumferential housing wall 26. In each chamber 27, 28, 29, a light-emitting diode 30 is provided, which illuminates the respective chamber 27, 28, 29.

As shown in FIG. 9, the display element 14 is located in the chamber 27. It is illuminated by the light-emitting diode 30 of the chamber 27. The display element 15 is located in the chamber 28 and is illuminated by its light-emitting diode 30. Correspondingly, the display element 16 is located in the chamber 29 and is illuminated by its light-emitting diode 30. The display elements 14, 15, 16 each completely fill the recesses or cutouts 10, 11, 12 in the second component 8. In the enlarged partial representation of FIG. 9, the display element 16 is omitted; at its point, the recess or cutout 12 can be seen.

Between the base of the circumferential groove 23 of the housing wall 26 and the upper end face of the circumferential frame 17 of the second component 8 a circumferential seal 31 is provided, by which the housing 13 is sealed. In particular, sealing against splash water is effected, which in the case of rain or when washing the motor vehicle can get behind the trim 6. The circumferential seal 31 can be realized by a sealing bead, in particular by butyl or adhesive.

Figure 11:
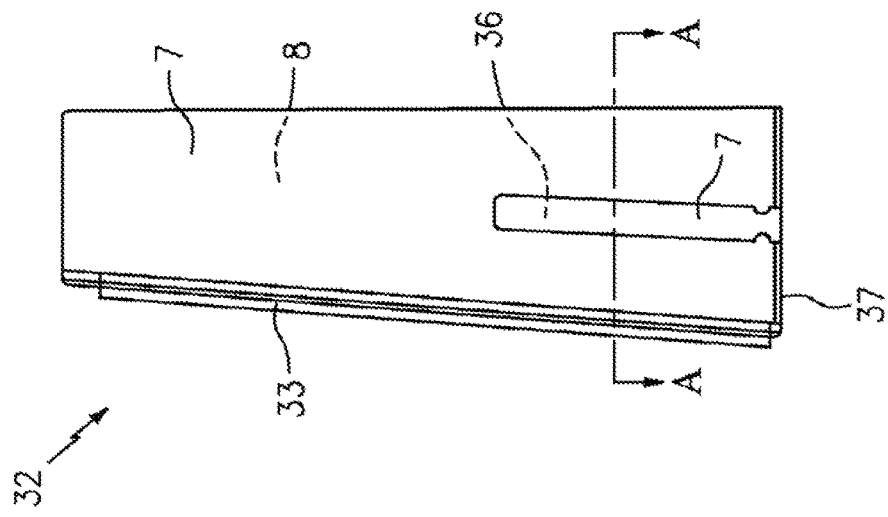
FIG. 11 shows the trim according to FIG. 10 in a view from outside.
Figure 10:
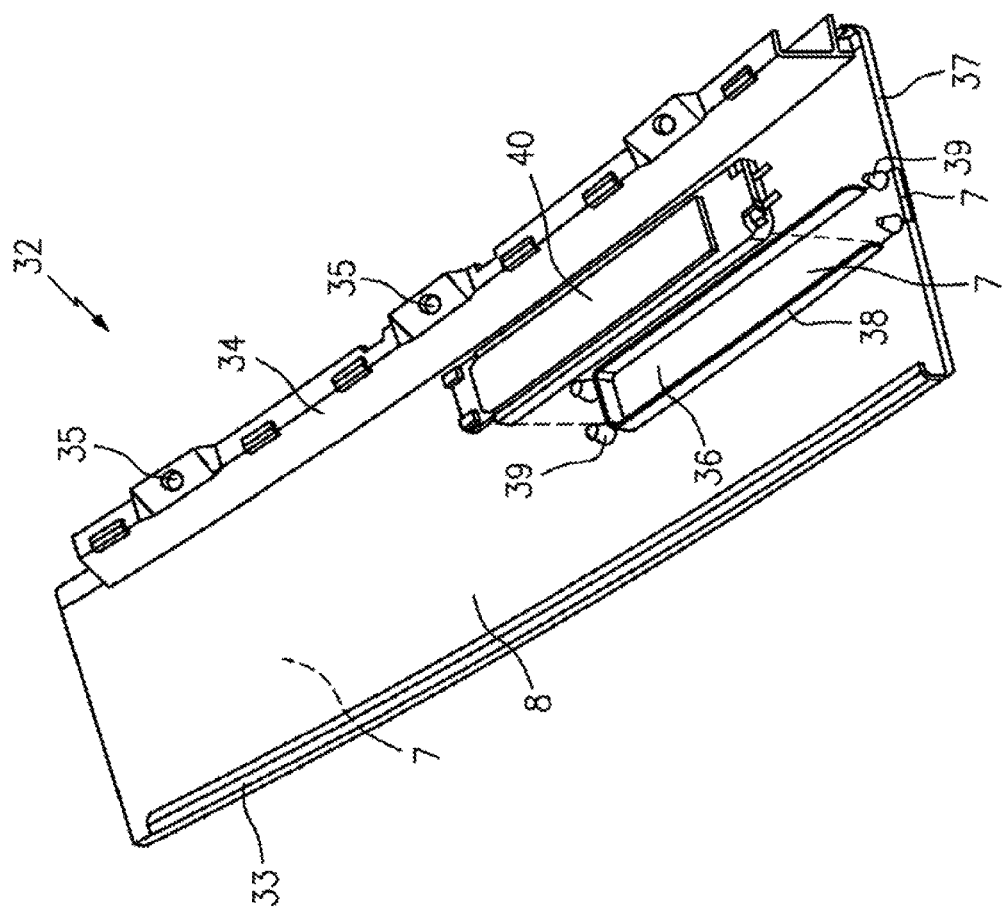
FIG. 10 shows a further embodiment of a trim with an entry system in a perspective representation.

FIGS. 10 and 11 show a further embodiment of a trim 32, which substantially corresponds to that of EP 1 695 808 A1, to which reference is made herewith. The trim 32 also is made by a two-component injection molding method. The second component 8 includes a fastening strip 33 and a fastening section 34, which is provided with fastening holes 35 and further mechanical fastening elements. The second component 8 furthermore includes a recess or cutout 36, which is substantially rectangular and extends in longitudinal direction of the trim 32. The recess or cutout 36 extends up to the edge 37 of the trim 32.

The fastening elements of the trim 32 are formed by a U-shaped frame 38 and lugs 39 for fastening screws or rivets, by means of which the housing 40 can be attached to the trim 32, namely to its second component 8. The fastening elements 38, 39 are molded to the second component 8. They are manufactured together with the second component 8 when manufacturing the trim by a multicomponent method, in particular a 2-component method.

Figure 13:
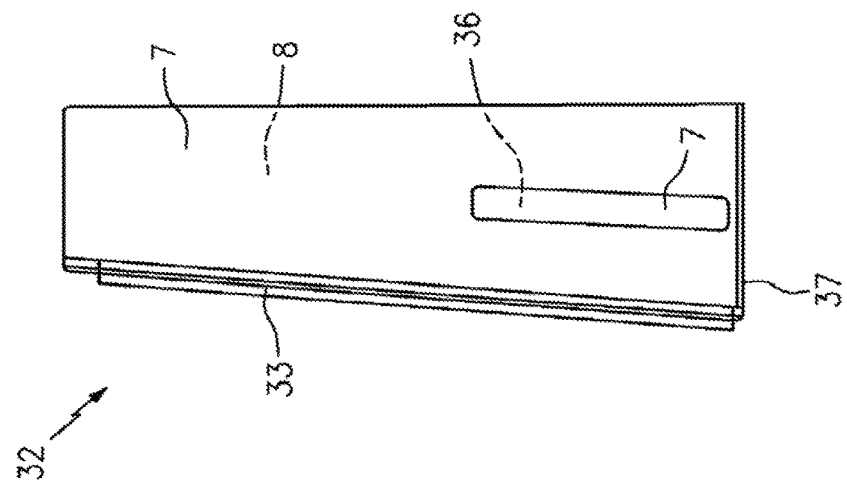
FIG. 13 shows the trim according to FIG. 12 in a view from outside.
Figure 12:
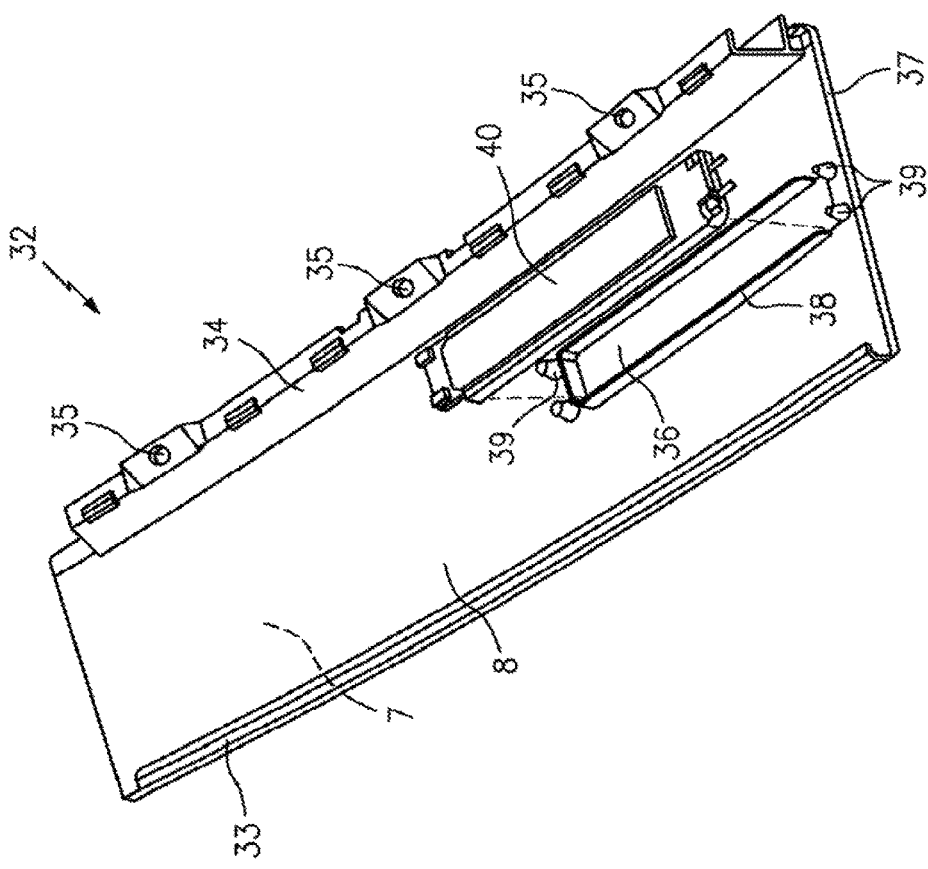
FIG. 12 shows a modification of the trim according to FIGS. 10 and 11 in a perspective representation.

FIGS. 12 and 13 show a modification of the trim 32 of FIGS. 10 and 11, in which corresponding parts are provided with the same reference numerals and are not described again. In contrast to the trim 32 as shown in FIGS. 10 and 11, the recess or cutout 36 of the trim as shown in FIGS. 12 and 13 does not extend up to the edge 37 of the trim 32. Here, the recess or cutout 36 ends before this edge 37. The recess or cutout 36 is enclosed on all sides by the base area of the second component 8.

Figure 14:
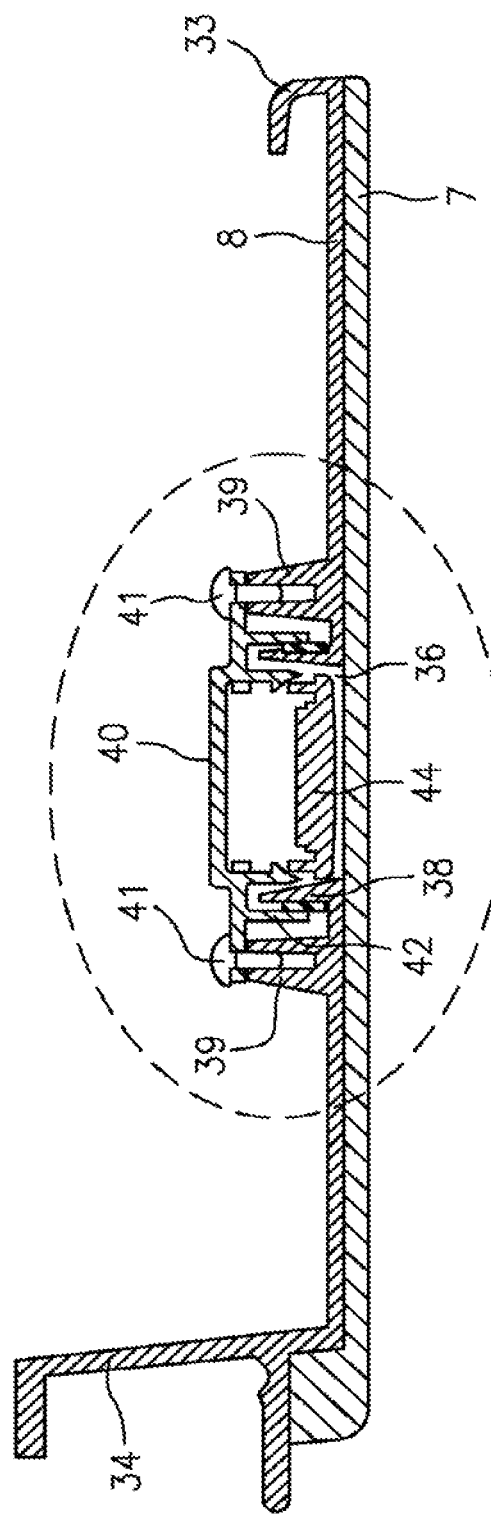
FIG. 14 shows a section along line A-A in FIG. 11.
Figure 15:
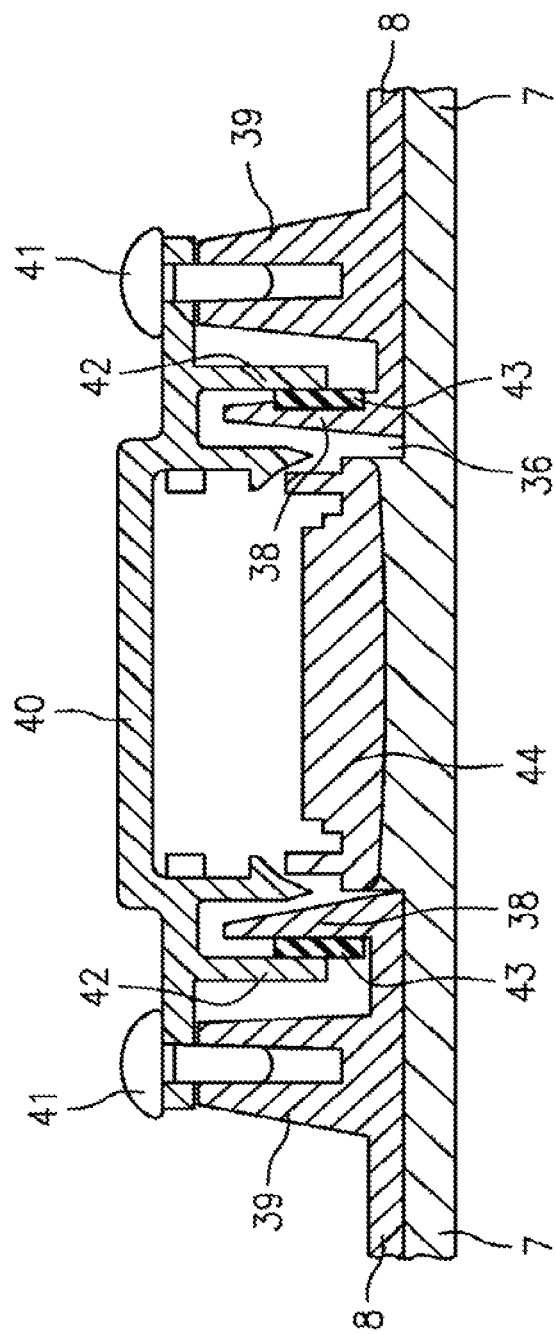
FIG. 15 shows an enlarged representation of a part of FIG. 14.

FIGS. 14 and 15 show a section along line A-A in FIG. 11. The housing 40 is attached to the lugs 39 of the second component 8 by screws or rivets 41. The circumferential edge 42 of the housing 40 encloses the U-shaped frame 38 of the second component 8. The housing 40 is sealed by a seal 43, which is located between the circumferential edge 42 and the U-shaped frame 38.

In the housing 40, a keypad 44 of an entry system is arranged. The keypad 44 includes display elements and input elements. The light emitted by the display elements penetrates the first component 7 and thus makes these display elements visible. The input elements can be actuated through the first component 7, in particular by finger pressure.

Figure 16:
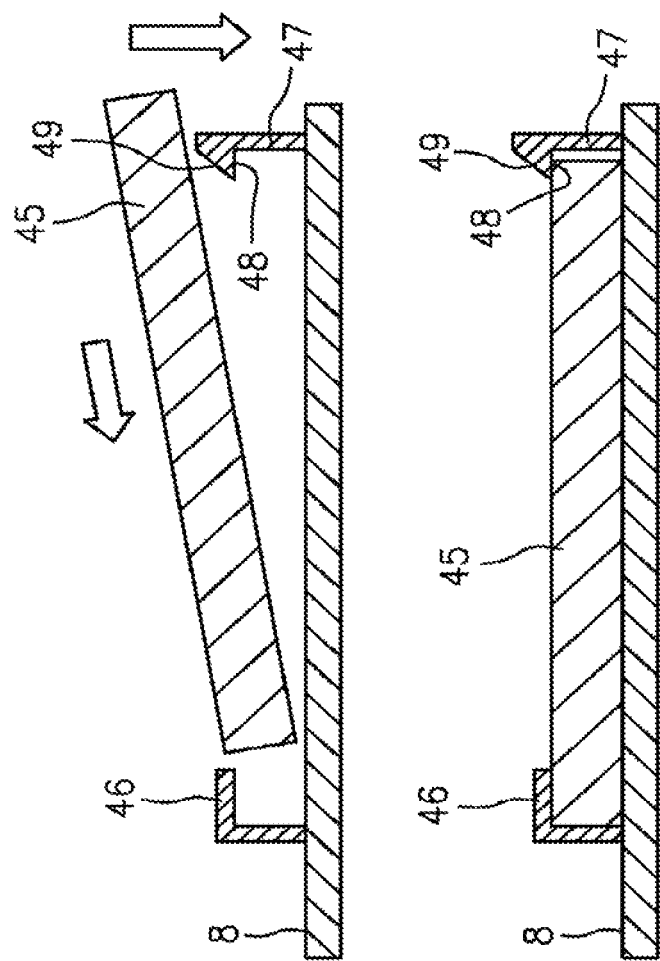
FIG. 16 shows a further example for a trim with a keypad for entering an access code of a motor vehicle in a longitudinal section.

FIG. 16 shows another embodiment of a keypad 45, which includes a luminous unit. Here, no housing is provided. To the second component 8 an L-shaped holder 46 and a holding lug 47 with a barb 48 are molded, which barb includes an inclined insertion surface 49. The keypad 45 initially is inserted below the L-shaped holder 46 at an angle, as shown in the upper Figure, and subsequently pressed in via the inclined surface 49 of the barb 48, wherein the flexible holding lug 47 is elastically deformed to the outside, i.e. away from the keypad 45. In the region of the keypad 45 one or more recesses are provided in the second component 8, which are not shown in FIG. 16.

By means of the invention, a vehicle trim made of plastics with an integrated information window is created. In the transparent or semi-transparent window information can also be displayed optically. In particular, this can be the following information: Charge control with battery-powered cars; parking time display for indicating the digital parking ticket bought (green/red); keypad for entering an access code to the vehicle; fingerprint for access authorization to the vehicle; status display with a taxi (occupied/free); letterings and logos (GTI, Ghia etc.); display area full-size as a design element; flashing function; display of the vehicle condition (open/closed), in particular during leave and/or approach of the driver/owner; display of the vehicle position for other road users, in particular by a reflection foil, in particular with poor visibility and/or at night.

In the invention, the second component can form a functional layer, which is recessed in part, in order to let information shine through. The first component can form a decorative surface or covering surface. It can include elevations in the form of a logo or a lettering. These raised contours can be illuminated from behind. The trim including its components is a molded part, which preferably is made by an injection molding method. The trim preferably is provided for the vehicle exterior.

It can be disposed on one of the pillars of the vehicle (A-pillar, B-pillar, C-pillar) and/or on a vehicle door. Fastening elements (clips, screw bosses, welding roots etc.) for fastening the display elements or input elements or a luminous unit can directly be molded to the trim.

It is possible that the display elements and/or input elements become visible only upon activation. The display elements and/or input elements can, however, also be activated constantly. The can be designed as luminous elements.

In a battery-powered car, a charging current control can be integrated in the (C-pillar) capping. As a result, the customer or driver can receive a feedback on the charge condition even in an electric vehicle. The control can be effected via a simple LED or via several, for example three different colors. It is also possible to indicate the remaining mileage in kilometers as number or the remaining battery lifetime.

By means of the invention a reflection foil can be realized. In road traffic, reflectors serve to increase the traffic safety. In general, they are directly integrated in the headlamps or attached to the bumpers. The solution in accordance with the invention with transparent or semi-transparent covering layer provides for easy integration of the reflectors into a trim without having a disturbing effect. In particular, reflectors can be positioned in the lateral regions of the vehicle, whereby the traffic safety can additionally be increased.

The following is claimed:

1. A vehicle trim for supporting an illuminable electronic element, the vehicle trim comprising:
    a first component formed of an at least semitransparent first material, the first component having an outer surface defining a portion of an exterior of the vehicle trim; and
    a second component formed of a second material less transparent than the first material, the second component disposed on the first component and defining an inner surface of the vehicle trim, the second component defining a recess that is free from the second material and having a frame protruding from a rear portion of the second component proximal to the recess, and wherein the first component is disposed overtop the recess; and wherein the recess is configured to receive the illuminable electronic element.

2. The vehicle trim of claim 1 wherein the second component is formed directly on the first component and the second material substantially covers the rear portion of the first component.

3. The vehicle trim of claim 1 wherein the frame includes edges that define the recess.

4. The vehicle trim of claim 1 wherein the frame extends entirely circumferentially around the recess.

5. The vehicle trim of claim 1 wherein the frame has a U-shaped configuration surrounding a substantial portion of the recess.

6. The vehicle trim of claim 1 wherein the frame extends substantially perpendicular to the rear portion of the second component.

7. The vehicle trim of claim 1 further comprising a housing connected to the second component for attaching the illuminable electronic element to the second component.

8. The vehicle trim of claim 7 wherein the housing covers the recess and locates the illuminable electronic element in the recess.

9. The vehicle trim of claim 7 wherein housing locates the illuminable electronic element directly adjacent to a rear surface of the first component in the recess of the second component.

10. The vehicle trim of claim 7 wherein the housing completely conceals the recess when viewed from the rear surface of the vehicle trim.

11. The vehicle trim of claim 7 wherein the housing further comprises a circumferentially-extending edge arranged to enclose the frame.

12. The vehicle trim of claim 11 further comprising a circumferential seal disposed between the circumferentially-extending edge and the frame.

13. The vehicle trim of claim 7 wherein the housing includes a circumferential groove and the frame is disposed within the circumferential groove.

14. The vehicle trim of claim 1 further comprising a hook spaced apart from an edge of the second component that defines recess, the hook molded to the second plastic component layer and protruding from the second plastic component layer to attach to the illuminable electronic device.

15. A vehicle trim comprising:
a first component formed of an at least semitransparent first material, the first component having an outer surface defining a portion of an exterior of the vehicle trim, wherein the outer surface is continuous and uninterrupted by openings; and
a second component formed of a second material less transparent than the first material, the second component formed directly on the first component and the second material substantially covering an inner surface of the first component and extending to substantially an entirety of a periphery of the first component, and the second component defining a recess that is free from the second material, wherein the recess is configured to receive an illuminable electronic element, and wherein the illuminable electronic element is in contact with the first component when disposed in the recess.

16. The vehicle trim of claim 15 wherein the second material completely covers the inner surface of the first component except within the recesses defined by the second component.

17. The vehicle trim of claim 15 wherein the illuminable electronic element is visible through the first component when in an illuminated condition.

18. The vehicle trim of claim 15 wherein the illuminable electronic element fills the recess.

19. The vehicle trim of claim 15 wherein the illumination of the illuminable electronic element is activated by a sensor.

20. The vehicle trim of claim 15 wherein the electronic element is visible through the first component only upon illumination of the illuminable electronic element.

21. The vehicle trim of claim 15 wherein the illuminable electronic element includes an input element which is actuated through the first component.

22. The vehicle trim of claim 15 wherein the illuminable electronic element is a display element for displaying information optically through the first component.

23. The vehicle trim of claim 15 further comprising a frame extending from a rear portion of the second component and a housing disposed overtop the frame, the housing configured to support the illuminable electronic element within the recess.

* * * * *